United States Patent [19]

Haglund

[11] 4,155,081
[45] May 15, 1979

[54] RECHARGEABLE BATTERY BACKUP POWER SOURCE FOR AN IONIZATION SMOKE DETECTOR DEVICE

[75] Inventor: Stephen A. Haglund, Minnetonka, Minn.

[73] Assignee: Honeywell Inc., Minneapolis, Minn.

[21] Appl. No.: 844,996

[22] Filed: Oct. 25, 1977

[51] Int. Cl.² .................. G08B 17/10; G08B 21/00; H02J 7/02
[52] U.S. Cl. .................................. 340/629; 320/48; 340/636; 340/333
[58] Field of Search .................. 340/237 S, 249, 333, 340/628, 629, 630, 636; 320/48

[56] References Cited

U.S. PATENT DOCUMENTS

| 3,421,066 | 1/1969 | Flynn et al. | 340/249 X |
| 3,750,123 | 7/1973 | Caillouet, Jr. | 340/237 R |
| 3,890,555 | 6/1975 | Nelson et al. | 320/48 X |
| 4,038,649 | 7/1977 | Dobrzanski | 340/237 S |

Primary Examiner—John W. Caldwell, Sr.
Assistant Examiner—Daniel Myer
Attorney, Agent, or Firm—Clyde C. Blinn; Henry L. Hanson

[57] ABSTRACT

A circuit for a rechargeable battery backup power source used with an ionization smoke detector device whereby upon the failure of the main alternating current power source, a battery which is normally charged from the power source during standby operation is connected to an ionization smoke detector circuit to maintain its energization upon the loss of the alternating current power source.

3 Claims, 1 Drawing Figure

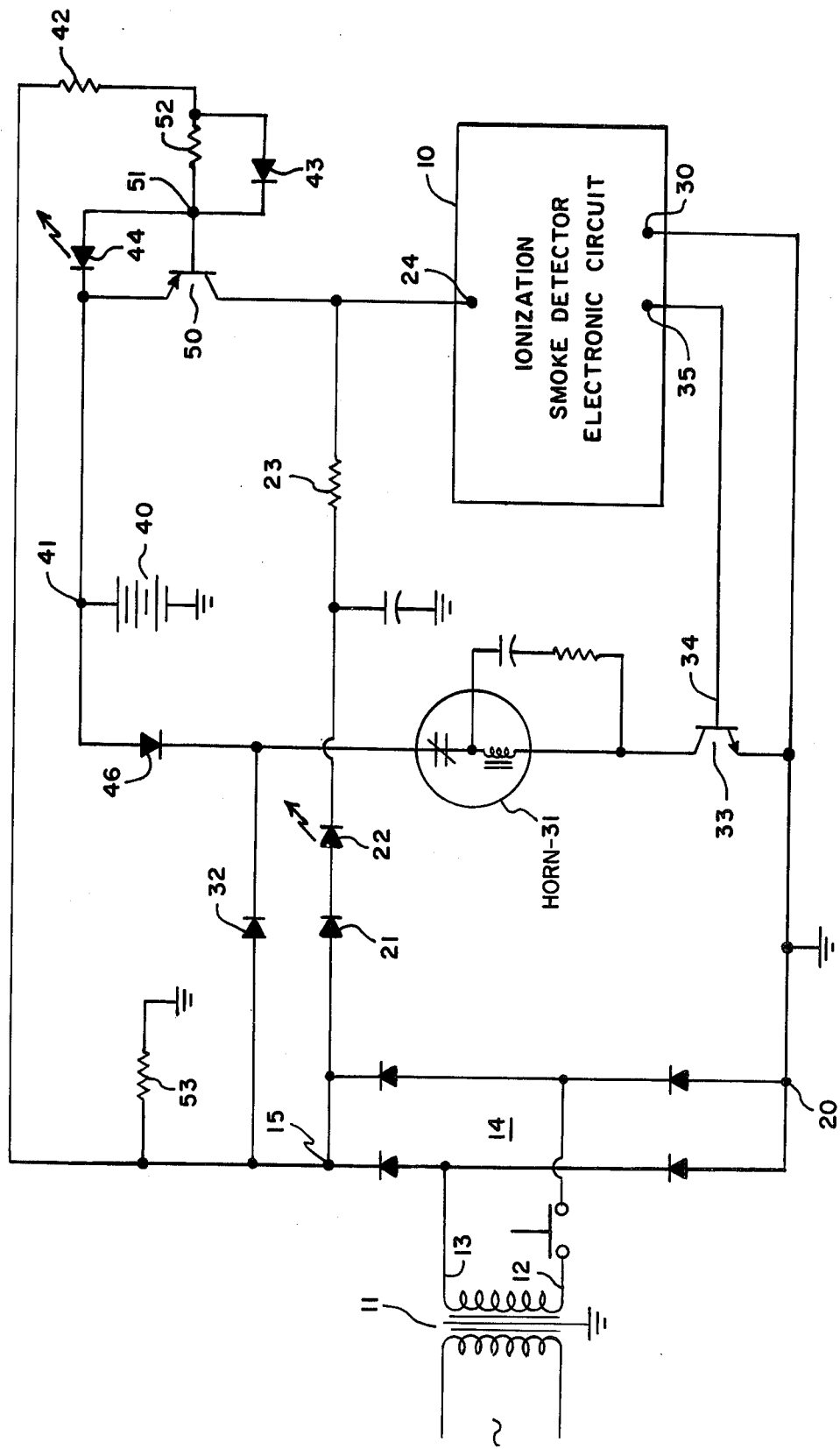

RECHARGEABLE BATTERY BACKUP POWER SOURCE FOR AN IONIZATION SMOKE DETECTOR DEVICE

BACKGROUND AND SUMMARY OF THE INVENTION

With the advent of the importance of smoke detectors of the ionization type for homes or dwellings, many ionization smoke detection apparatuses are presently available which are either powered by a transformer connected to a conventional alternating current power source or a battery for providing a direct current power source.

Under certain conditions and in certain localities, there is a need for an ionization smoke detector device which can be extremely dependable even though there is a loss of alternating current power and which need not be supervised over long periods of time to insure that a battery is not dead and to insure that adequate signaling will alert the occupants of homes or dwellings of the presence of smoke. While it is recognized that rechargeable battery backup systems are used in many appliances and safety lights, the present invention is concerned with a use of such a rechargeable battery backup circuit in an ionization smoke detector apparatus.

DRAWING

A single FIGURE discloses the circuit for the rechargeable battery backup power source with the recharging circuit for use in the ionization smoke detector apparatus.

DESCRIPTION AND OPERATION OF THE INVENTION

Referring to the single FIGURE, a circuit diagram is shown for an ionization smoke detector device powered from a conventional alternating current power source and having a rechargeable battery backup. The ionization smoke detector device has an ionization smoke detector electronic circuit apparatus 10 which comprises a detector chamber from which a signal is derived upon the presence of smoke. Such an ionization smoke detector electronic circuit is of the type as shown in the United States John L. Kabat U.S. Pat. No. 4,017,852 issued Apr. 12, 1977, and the specific chamber is of the type shown in the United States Larry D. Larsen et al. U.S. Pat. No. 3,849,685 issued Nov. 19, 1974. The ionization smoke detector electronic circuit 10 is powered from a transformer or power supply 11 having secondary output terminals 12 and 13 from which a lower voltage is available when the primary of the transformer is connected to an alternating current source of power or a normal house wiring system. A rectification circuit or diode bridge 14 provides a rectified voltage between terminals 15 and 20. Terminal 20 is connected to ground so that the voltage at terminal 15 is a rectified direct current voltage. Terminal 15 is connected to a series circuit of a diode 21, a light emitting diode 22 and a resistor 23, and an input terminal 30 is connected to ground. Diode 22 indicates current flow to the smoke detector apparatus 10 from power source 11 for operation.

Annunciator or horn 31 is connected between terminals 15 and 20 through a diode 32 and a switch 33 of a transistor type which is controlled over a control circuit 34 connected to the output terminal of the detector 35. Upon the presence of an abnormal smoke condition as sensed by smoke detector 10, an output at 35 causes switch 33 to close and energize horn 31.

A battery 40 is connected between terminal 41 and ground. The battery is normally maintained charged by connecting terminal 41 to the output of the rectification circuit 14 at terminal 15 through a resistor 42, a diode 43 and a light emitting diode 44. Diode 44 is connected between the emitter and base of a switch or transistor 50. As long as the battery is in place and is being charged, the charging circuit is working properly. The light emitting diode 44 indicates the presence of a battery charging current flowing for the charging circuit operation. The light emitting diode 44 also clamps the reverse base emitter voltage drop of transistor 50 below the base emitter breakdown voltage.

Battery 40 is connected to horn 31 through diode 46 which also provides high impedance isolation for rectifier 14 to the battery. Battery 40 is connected to the input terminal of the detector circuit 10 through switch or transistor 50 which has a control circuit connected to base terminal 51. Terminal 51 is connected to the rectifying circuit 14 at terminal 15. Terminal 15 is also connected to ground through a high resistance resistor 53; so that, as long as there is a voltage available at terminal 15, transistor 50 is back biased and does not conduct through the control circuit 51. Upon a loss of the voltage at terminal 15 and the removal of the voltage from one side of resistor 53, the current flows from the battery through the transistor and control circuit 51 and resistor 53 to ground, to bias transistor 50 conductive and allow the battery 40 to power the smoke detector circuit 10.

The embodiments of the invention in which an exclusive property or right is claimed are defined as follows:
1. A circuit for a battery backup power source for a main alternating current power source furnishing power to an ionization smoke detector alarm device comprising
   a pair of input terminals adapted to be connected to the main alternating current power source,
   a rectifier circuit connected to said input terminals and having a pair of output terminals for furnishing a direct current voltage source, one of said output terminals being grounded,
   an ionization smoke detection circuit apparatus having two input circuits and an output circuit,
   first circuit connection means including a diode for connecting said two input circuits of said detection circuit apparatus to said pair of output terminals of said rectifier circuit so that current flows from one of said pair of output terminals through said diode to energize said apparatus,
   an annunciator,
   second circuit connection means including a first transistor switch means and a second diode for connecting said annunciator to said pair of output terminals of said rectifier circuit, said first transistor switch means being connected to and controlled by said output of said detection circuit apparatus whereby upon an abnormal smoke condition existing, said first switch means is energized to close the energization circuit for said annunciator,
   a rechargeable battery having one terminal connected to ground and a second terminal, third circuit means connecting said second terminal of said rechargeable battery to the other of said output terminals of said rectifier circuit, second transistor switch means having a control circuit connected to said rectifier circuit to be responsive to the presence of an output of said rectifier circuit, said control circuit being connected to ground through a bias resistor connected to one of said output terminals of said rectifier circuits, and fourth circuit means including said second transistor switch means for connecting said second terminal of said battery to one of said input circuits of said detection circuit apparatus whereby upon a loss of output of said rectifier circuit said control circuit losing its voltage bias from said bias resistor, said second transistor switch means is closed to connect said battery to said detection circuit apparatus.

2. The invention of claim 1 wherein
said third circuit means comprises a light emitting diode to indicate that current is flowing in the circuit for charging said battery.

3. The invention of claim 2 wherein
said first circuit connection means comprises a second light emitting diode to indicate that energizing current is flowing to said smoke detection circuit apparatus from said rectified circuit for its operation.

* * * * *